Dec. 1, 1964    J. CORDIER    3,159,702
SMELTING DEVICE

Original Filed Feb. 12, 1960    4 Sheets-Sheet 1

Dec. 1, 1964   J. CORDIER   3,159,702
SMELTING DEVICE

Original Filed Feb. 12, 1960   4 Sheets-Sheet 3

Inventor
Jean Cordier
BY
Michael S. Striker
Attorney

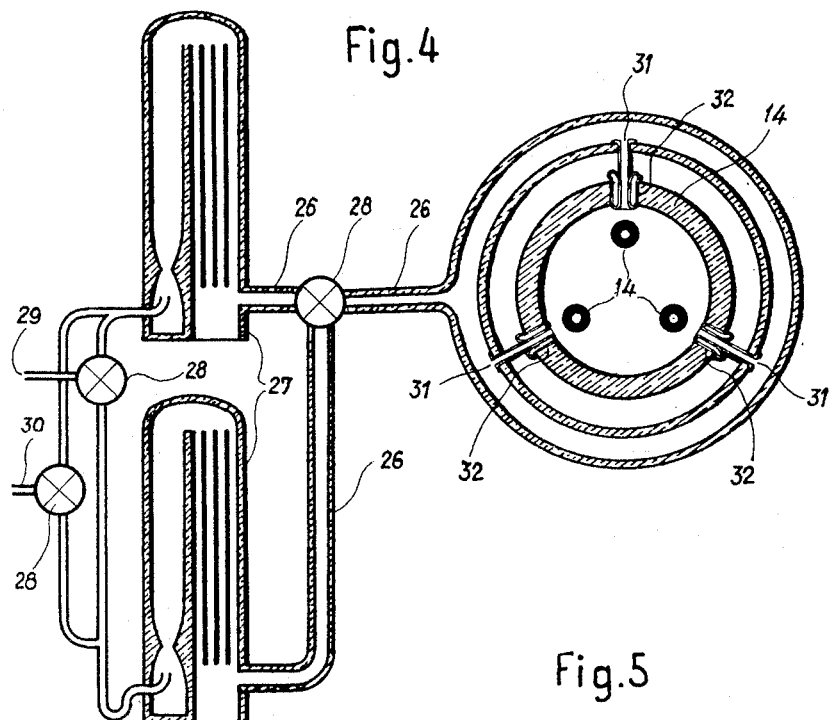
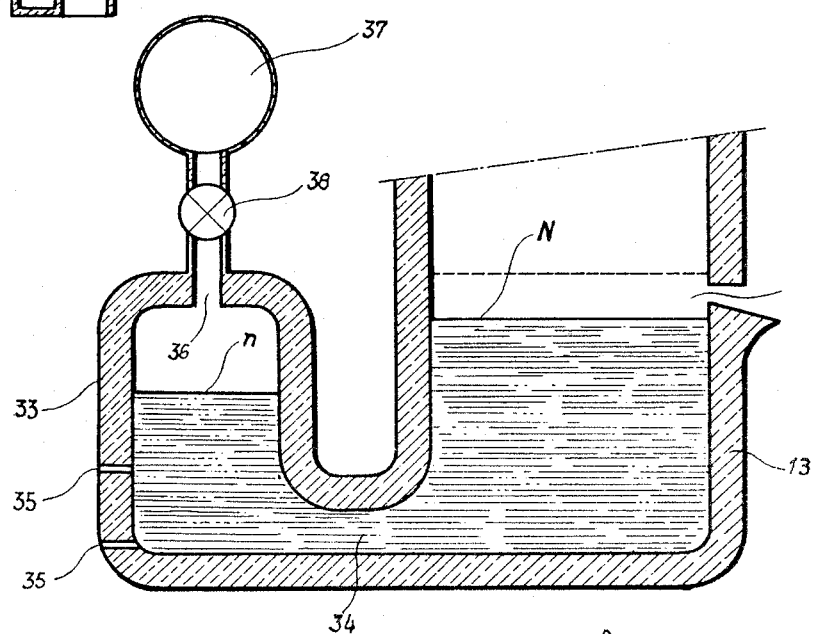

United States Patent Office 3,159,702
Patented Dec. 1, 1964

3,159,702
SMELTING DEVICE
Jean Cordier, Saint-Germain-en-Laye, France, assignor to Institut de Recherches de la Sidérurgie, Saint-Germain-en-Laye, France
Original application Feb. 12, 1960, Ser. No. 8,458. Divided and this application Oct. 11, 1960, Ser. No. 62,046
Claims priority, application France, Feb. 14, 1959, 786,759, Patent 1,226,532; Aug. 1, 1959, 801,789, Patent 1,242,894; Aug. 3, 1959, 801,848, Patent 1,241,196; Nov. 17, 1959, 810,351, Patent 1,249,437
3 Claims. (Cl. 266—10)

The present application is a division of my U.S. application Ser. No. 8,458, filed on February 12, 1960, and now abandoned, entitled "Smelting Method and Device."

The present invention relates to an ore smelting method and device, and more particularly to the smelting of iron ores in an electric arc furnace.

Considerable difficulties are encountered when it is attempted to produce in an electric arc furnace with a shaft pig iron or the like from iron ores. The amount of gas formed in such apparatus is relatively small and thus little pre-heating of the ore takes place before the same is subjected to the electric arc. Consequently, the reduction of iron ore by gases which occurs prior to reaching the electric arc zone, is insignificant. Various modifications of the method of smelting iron ore in electric furnaces were tried, however, it was not possible up to now to overcome the disadvantages which were connected with and believed to be inherent in the use of an electric furnace for this purpose.

It is therefore an object of the present invention to provide a smelting method and device including electric arc treatment of the charge which overcome the prior art difficulties and disadvantages of electric arc ore smelting.

It is another object of the present invention to provide a method and device by means of which electric arc iron ore smelting can be carried out in a simple, economical and reliable manner.

Other objects and advantages of the present invention will become apparent from a further reading of the description and of the appended claims.

With the above and other objects in view, the present invention contemplates a method of smelting ferrous ore, comprising the steps of heating the ores in an oxidizing atmosphere so as to oxidize the same and to form a hot oxidized ore charge, passing the charge in countercurrent flow to hot reducing gases through a reducing zone of an electric arc furnace so as to form a partially reduced charge, subjecting the partially reduced charge in the electric arc furnace to an electric arc so as to complete reduction of the charge and to separate the same into molten ferrous metal and slag, and recovering the molten ferrous metal from the electric arc furnace.

The process of obtaining molten ferrous metal from ferrous ore may be carried out, according to the present invention, in an electric arc furnace having an upper shaft portion, and a lower hearth portion in which the electric arc is formed, by forming a particulate mixture of ferrous ore and slag forming material, heating the mixture in an oxidizing atmosphere so as to obtain an oxidized hot charge, introducing the charge in hot condition into the furnace at the upper end thereof, allowing the charge to pass downwardly through the shaft portion and into the hearth portion of the furnace in countercurrent flow to hot reducing gases so as to partially reduce the charge in the upper shaft portion before the same reaches the hearth portion, subjecting the partially reduced charge in the hearth portion in the presence of reducing agents to an electric arc so as to complete reduction of the charge and to form a layer of molten ferrous metal and slag, and separating the molten ferrous metal from the slag.

Broadly, the ore smelter will comprise an ore melting section or hearth having an ore inlet portion, means for producing an electric arc in the ore melting section, shaft section having two opposite end portions, one of the end portions being located adjacent to and communicating with the ore inlet portion and the other of the end portions being adapted to receive ore, and means for injecting a hot reducing fluid into the smelter at a point spaced from the other of the end portions of the shaft section.

The present invention also contemplates an ore smelting arrangement which comprises, in combination, an electric arc furnace including a hearth section and at least one elongated shaft section superposed and communicating with the hearth section, the elongated section being so arranged as to permit entry of the charge, means for forming an electric arc in the hearth sections, means for introducing hot reducing fluid into the hearth section, ore treating means for oxidizing and heating an ore containing charge, and conveying means operatively connected to the charge treating means and to the upper end of the shaft section for passing said hot charge from the charge treating means into the upper end of the shaft section, whereby the charge will be heated and oxidized and the thus treated charge will pass downwardly through said shaft section into the hearth section of the electric arc furnace in countercurrent flow to the reducing fluid thus being partially reduced prior to being subjected to the electric arc formed in the hearth section.

Thus, according to the present invention part of the reduction of the metal oxides is carried out in the shaft of the furnace by means of the hot reducing gases flowing from the hearth chamber of the electric arc furnace. This is accomplished by pre-heating the charge on a sintering strand, preferably an endless conveyor belt, in an oxidizing atmosphere, and at such a temperature that subsequent reduction by means of reducing gases will be possible in all portions of the shaft of the furnace.

Another advantage of this process is the thermic gain in the furnace which corresponds to the sensible heat of the charge when introduced into the furnace.

The present invention allows the use as reducing agent, partially or exclusively, of liquid or gaseous hydrocarbons, thereby avoiding the disadvantages usually incurred when hydrocarbons are used in a reducing process, such as clogging of pipes used for supplying of hydrocarbons with carbon formed by premature partial cracking, or disadvantages due to the fact that the cracking is an endothermic phenomenon.

According to the present invention liquid ferrous metal is produced in an electric furnace with a shaft, by sintering and pre-heating iron ore and flux in an oxidizing atmosphere in order to obtain an oxidized and hot charge. The hot charge is then introduced without any substantial heat loss, into a frustoconical shaft surmounting the hearth of the electric arc furnace used for reduction and smelting. The charge is partially reduced in the shaft by means of hot reducing gases which traverse the shaft in the direction from the hearth toward the upper open end of the shaft countercurrently to the descending charge. Furthermore, reducing agents are introduced into the hearth which are destined to cause reduction in the hearth and in the shaft, and to carburate the metal, thereby completing the reduction of the charge and melting the same in the hearth of the reducing and smelting electric furnace so as to separate the liquid metal from the slag or molten gangue.

The process of the present invention also may include some of the following features:

(a) Some of the reducing agents introduced into the furnace may be liquid or gaseous hydrocarbons, which are cracked in the hearth.

(b) Some of the reducing agents introduced into the furnace may be liquid or gaseous hydrocarbons, whose cracking is effected almost completely outside of the furnace, in special cracking chambers.

(c) The external cracking of hydrocarbons may be carried out in at least two chambers of regenerator type, which chambers are used alternatively for the cracking phase and the heating phase.

(d) In the event of intermittent external cracking, in special chambers, the varying temperatures of the products of cracking introduced into the electric furnace may be compensated by injections of cold gaseous hydrocarbons at the nose of electrodes in variable quantities depending on the temperature of the simultaneously introduced cracked gases in such a manner as to maintain the thermic equilibrium of the furnace at all times.

(e) The liquid metal in the hearth may be maintained at a constant level.

(f) When treating ores which are only slightly reducible, such as are used in the production of ferro-alloys, the reducing agents preferably are introduced into the electric furnace in a ratio of hydrogen by weight to carbon by weight equal at the most to 0.20.

(g) When treating ores which are easily reducible destined for the production of pig iron, the total of reducing agents introduced into the electric furnace preferably includes a ratio of hydrogen to carbon within the range of 0.15 and 0.40 (by weight).

(h) When treating ores which are easily reducible and are destined for the production of steel, the total quantity of reducing agents introduced into the electric furnace preferably should have a ratio by weight of hydrogen to carbon equal to at least 0.60:1.0.

(i) In order to produce pig iron containing less than .4% of silicon, the electric furnace should be operated as a cold process by injecting hydrocarbons at the level of the electric arcs, in quantities proportionate to the electric power consumed by the arcs, and the manganese oxide (MnO) content in the agglomerate should be equal to at least 1.5% in order to avoid dangerous temperature fluctuations and to arrive at a stable "cold" process.

The entire installation according to the present invention comprises a sintering apparatus on an ore-supporting grid, with pre-heating of the gaseous fluid passing through the ore, means to dislodge the cake of the agglomerate produced by subjecting the ore on the grid to hot oxidizing gases, means to transport dislodged cake to the upper end of the electric furnace without substantial loss of heat, the furnace will include at least one preferably frusto-conical shaft situated above the hearth, several electrodes, as well as means for injecting under pressure liquid or gaseous hydrocarbons into the furnace.

The device may also include some of the following features:

(a) The injectors serving to introduce hydrocarbons into the hearth are preferably located at the periphery of the furnace.

(b) The injectors serving to introduce hydrocarbons into the hearth are located in a hollow, conduit-forming interior portion of the electrodes in axial direction of the same.

(c) The injectors serving to introduce part of the hydrocarbons are located at or near the end of the shaft, thereby facilitating the descent of the charge.

(d) The hydrocarbons conveying system of pipes and injectors may be cooled and thermally insulated in order to prevent premature cracking of hydrocarbons.

(e) Two chambers may be provided, similar to regenerators of blast furnaces, equipped with fire-bricks which can stand a temperature of about 1200° C., and placed alternatively in the heating phase with the aid of any gas such as hot waste gases, and in the cracking phase of hydrocarbons. These chambers are linked with the electric furnace.

(f) An auxiliary hearth may be provided connected with the hearth of the furnace by a channel linking the lower parts of the hearth and of the auxiliary hearth, the latter being situated outside of the electric furnace, and the pressure in the auxiliary hearth then may be adjusted so as to keep preferably the liquid metal in the hearth at a constant level.

The novel features which are considered as characteristic for the invention are set forth in particular in the appended claims. The invention itself, however, both as to its construction and is method of operation, together with additional objects and advantages thereof, will be best understood from the following description of specific embodiments when read in connection with the accompanying drawings, in which:

FIG. 4 is a plan, cross-sectional view of a device for injection of cracked hydrocarbons into the hearth; and FIG. 5 is a schematic elevational view in cross-section of a device for maintaining in the hearth an even upper level of molten metal.

Figure 1:
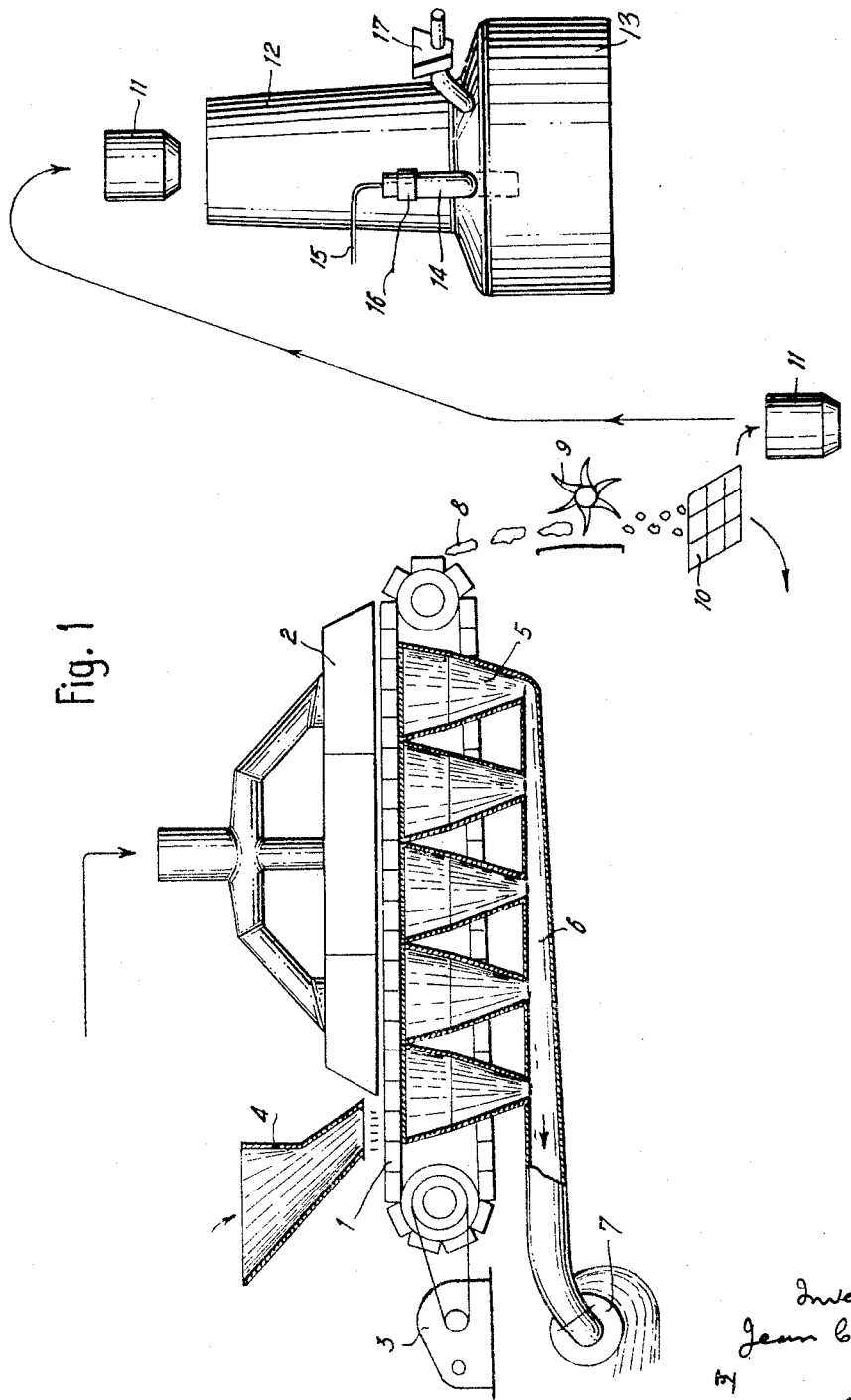
FIG. 1 is a schematic view of an arrangement according to the present invention.

Referring now to the drawings, and particularly to FIG. 1, the illustrated device includes an endless sintering strand, known per se, equipped with a hood 2 for conveying a pre-heated fluid, for instance, hot air. The chain conveyor is operated by motor 3. The loading device is designated by 4. Wind-boxes 5 lead to main smoke conduit 6 which communicates with exhaust fan 7.

After leaving the sintering strand, the sinter 8 is broken by sprocket-wheel 9 and passes through a conventional sifting device 10. The charge is then dropped into insulated buckets 11 and conveyed to the upper open end of shaft 12 of the electric furnace, located above hearth 13. FIG. 1 shows one of a plurality of electrodes 14 receiving liquid or gaseous hydrocarbons at 15 and obtaining electric power through electric cables 16. A device which feeds solid fuel is designated by reference numeral 17.

Figure 2:
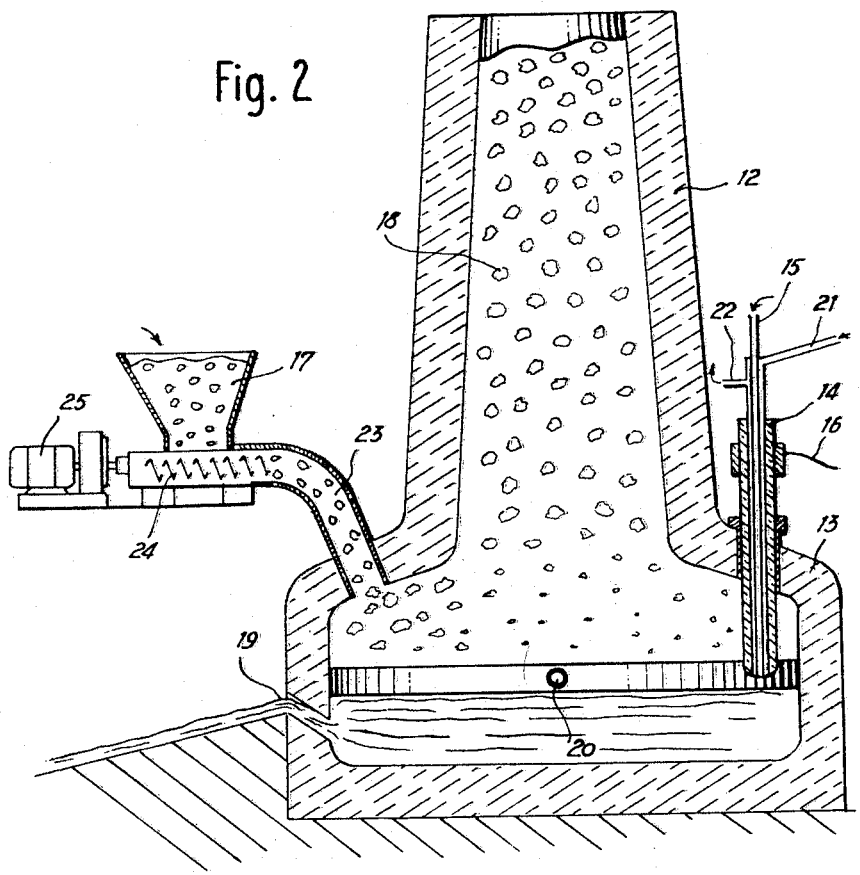
FIG. 2 is an elevational axial section of the electric furnace shown in FIG. 1, but on a larger scale.
Figure 3:
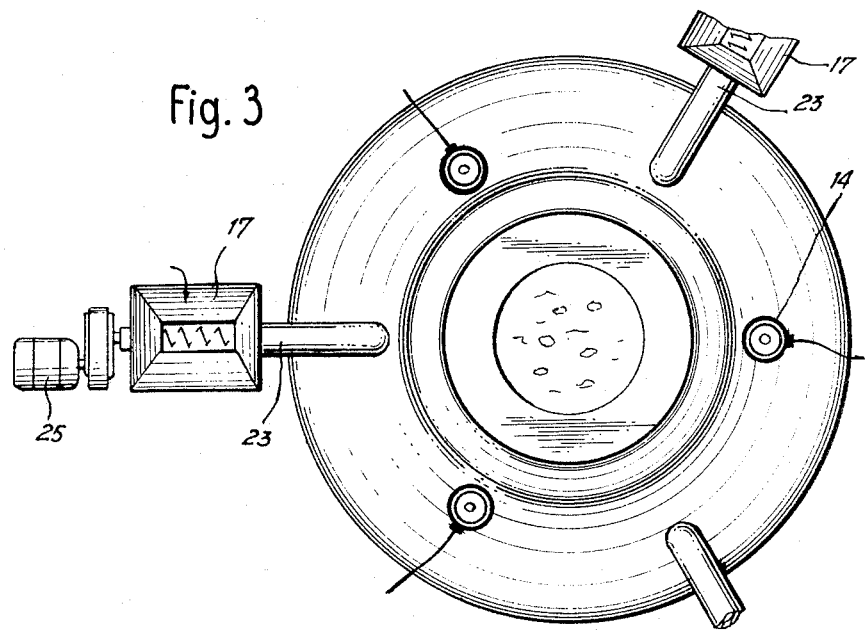
FIG. 3 is a top view of the furnace illustrated in FIG. 2.

FIGS. 2 and 3 illustrate the electric furnace according to the present invention in more detail. Reference numeral 18 designates the sinter which is loaded into the shaft and which descends into the hearth 13 which has a tap hole 19 for liquid metal and a tap hole 20 for the slag. The dome of the hearth is pierced by three hollow electrodes 14, which are cooled by water introduced at 21 and leaving at 22. The dome is also traversed by three gas-tight spouts 23, each extending from the base of a hopper or bin 17 containing solid fuel. The solid fuel is pushed into the hearth by screw 24, which is activated by motor 25. A lock chamber, which is not illustrated, provides gas-tightness, so that the gases in the hearth cannot escape through feeding device 17.

The following is a description of phenomena and chemical reactions taking place in the furnace:

The liquid or gaseous hydrocarbons are cracked, if they were not cracked prior to reaching the furnace. The liberated hydrogen, which is pre-heated, flows then in counter-current to the charge which descends through the shaft. The carbon is dissolved in the pig iron to a great extent and the portion of it which does not so react is deposited on solid surfaces. The carbon contained in the solid fuel, the carbon dissolved in the pig iron and the carbon deposited on solid surfaces performs the final reduction of the slag as well as the reduction of oxides which were not reduced in the shaft. By this reduction carbon monoxide is formed which, when mixed with hydrogen, produces the gas which performs the reducing operation in the shaft.

These conditions are particularly favorable so that the reduction is rapid and complete. The oxides are at a suitable temperature (800 to 1150° C.) and the gases have such a composition, containing little, if any, nitrogen and being a mixture of CO and $H_2$, that the reactions are rapid and that the composition of the gases is close to the reduction equilibrium. The gases are therefore well utilized and, if they leave hot, this is of little importance from the thermic point of view, because their volume is small.

In the zone of the electric arcs, the hot products which are partially reduced, are melted. Iron is again incorporated in the pig iron, the still ferrous slag is reduced by the carbon dissolved in the pig iron. Pig iron and the slag are tapped separately. The thermic level of the hearth, the composition of pig iron and of slag, i.e., the degree of reduction is controlled by the quantity of electricity which is admitted and the quantity and the composition of the injected hydrocarbons. In this manner it is possible to produce classical pig iron, pig iron with low carbon content, steel and ferroalloys.

As mentioned already earlier, the total weight of reducing agents per one ton of pig iron, is considerably lower than the corresponding weight in conventional electric furnaces. Of course, the amount of injected hydrocarbons can be varied in order to regulate rapidly the operation of the furnace and the composition of the produced pig iron. Moreover, the pre-heating of the ore on the sintering strand and the pre-reduction in the shaft allow to limit the amount of electric energy consumed by the electric furnace to the amount of heat necessary in order to melt the products, to crack and pre-heat the injected hydrocarbons and to perform the final reduction.

Since the production of an electric furnace is limited by the amount of kilowatts which it can absorb, therefore, the described process fully utilizes the productive capacity of the electric furnace without requiring complex operations with correspondingly high capital investment.

The use of cracked and hot hydrocarbons, for instance, of natural gas, instead of cold hydrocarbons, allows to reduce considerably the thermic requirements at the level of the hearth and thus to lower the consumption of electricity, gaining the advantages connected with it, particularly the possibility to construct units of increased capacity.

An application of the process will be understood easily with the aid of FIG. 4, wherein insulated pipes 26 are shown leading from cracking chambers 27. These chambers 27 are placed alternatively in a heating phase and a cracking phase by means of reversing valves 28 which send into each chamber alternatively a heating gas arriving at 29 and the hydrocarbons which arrive at 30. The pipe 26 envelops the hearth 13 of the electric furnace, it communicates with three tuyeres 31, cooled by water-jackets 32, directed toward the nose of the electrodes 14. The cracked gases are brought thus to the place where the electrodes are subjected to the maximum temperatures which causes a considerable cooling of the latter. Moreover, these electrodes are hollow and are used in order to allow injections of variable quantities of cold non-cracked gas which are to compensate for the variable temperature of cracked hydrocarbon gases coming from chambers 27, in order to maintain at all times the thermic equilibrium of the furnace.

The device shown in FIG. 5 will serve to maintain a constant level of liquid metal in hearth 13 of the electric furnace.

It shows a receptacle fore-hearth 33, which is linked by a low channel 34 with the level of hearth 13. It is desirable to maintain level N in the hearth at a constant height, despite the continuous influx of deoxidized metal. In order to obtain this result, fore-hearth 33 is made gas-tight, but nevertheless allowing to empty the same by one or several tap holes 35; these tap holes are usually sealed off hermetically. The basic idea of the process used to maintain constant the level N in the hearth consists in acting on the level $n$ by means of an orifice 36 of the fore-hearth chamber in order to create the necessary overpressure or depression therein. This is done with the help of pressure or depression generator 37 which controls the pressure in the fore-hearth, in connection with valve 38.

In this manner, when enough metal is accumulated in the fore-hearth chamber, it is sufficient to open one of the tap holes 35 in order to evacuate a given quantity of liquid metal and to lower the level of molten metal in the fore-hearth to the height of such tap hole, so that, after resealing of the tap hole, additional molten metal may pass from the hearth chamber to the fore-hearth chamber.

As it can be easily understood, it is an important feature of the process according to the present invention to feed the electric furnace with hot oxidized sinter introduced at the top of the shaft, simultaneously reducing agents are introduced into the hearth. In fact, it is the increased temperature of the charge which descends through the shaft which causes that the hot reducing gases rising from the hearth will bring about the beginning of the reduction.

In order to obtain a sinter, the average temperature of which is the highest possible, the sintering of crushed and sifted ore of a suitable dimension on a sintering strand is started with the pre-heating of the oxidizing gas which is to pass through the charge. This sintering is made in an oxidizing atmosphere, so that the charge which is introduced into the shaft of the electric furnace is in highly oxidized condition. This procedure has a twofold advantage: first, it allows the heating of the ore on the sintering apparatus to a high temperature with a good thermic yield, and secondly, it furnishes a charge which is easily reducible and has a higher softening temperature. In fact, the heating is effected under conditions which are so much the better than it is effected in an oxidizing atmosphere.

Moreover, a charge can be reduced more easily in the shaft of the furnace, if it was oxidized to the maximum before it was introduced, as metallurgists know, partly due to physico-chemical reasons, like the relative reducibility of different ferrous oxides, and partly for physical reasons, like the porosity of the charge which is subjected to the reduction process. While it is difficult to proceed in this manner when preparing charges for blast furnaces because it results in a friable sinter of small granulometry, nevertheless, this method, according to the present invention, is practicable and even desirable in an electric arc furnace, in view of the limited height of the shaft and the small amount of reducing gases which pass through it. On the other hand, it is advantageous to perform the oxidation and sintering of the charge in a thick layer, which improves still further the thermic yield of the pre-heating on the sintering strand. In this manner, the sinter, when it leaves the sintering apparatus, will have an average temperature between 800 and 1150° C.

To the iron ore, before it undergoes the processes of pre-heating and sintering, there may be added a slight quantity of solid fuel. There also may be added all the necessary flux or slag forming additives for the subsequent formation of slag in the electric furnace, or only a part of the same, the balance being introduced directly into the hearth.

The sintering material may be simply mixed or charged in the form of pellets whose diameter may reach 25 mm. It is also possible, without going beyond the limits of the invention, to perform the sintering on an apparatus with a continuous strand, or with a number of vats operating intermittently.

The sinter cake obtained when it leaves the sintering apparatus is then dislodged, broken down and sifted and introduced into the upper part of the shaft of the electric furnace. In order to make the most of the advantages offered by pre-heating in oxidizing atmosphere, the sinter should be transported from the outlet of the sintering strand to the shaft of the furnace with the least possible loss of heat. This transporting operation can be effected in insulated buckets and in a metallic conveyor inside of an insulated passageway.

The reducing agents introduced into the hearth of the electric furnace can be solid bodies, liquids or gases, or mixtures thereof in suitable proportions. Particularly, a solid fuel with carbon basis, like for instance, coke, can be introduced either directly around the electrodes or through openings in the top of the hearth connected with storage bins. The reducing agents can also be liquid or gaseous hydrocarbons introduced either separately or together with a solid fuel. The liquid hydrocarbons can be atomized, for instance, with compressed air, but this is not absolutely necessary. The hydrocarbons can be introduced into the hearth by injectors situated at the periphery of the hearth, or by injectors passing through the top of the hearth of the furnace and oriented toward the surface of the liquid metal. They also can be introduced into the hearth across the electric arc, by injectors placed in the axes of the electrodes, or across the liquid metal by porous elements situated in the bottom of the hearth, underneath the electrodes. It is also possible to inject a portion of gaseous hydrocarbons at the bottom of the shaft in order to facilitate the descent of the charge.

The hydrocarbons introduced into the furnace may have been cracked previously or may not have been cracked. In the event that they were not cracked previously, the cracking takes place in the apparatus, preferably in the zone of the electric arcs. In this case, it is possible to prevent premature cracking of hydrocarbons in the pipe system or in the injectors, which premature cracking is linked with the disadvantage that it liberates powdery carbon and brings about clogging, by cooling the hydrocarbons conveying system, and thermal insulation of the injectors or pipes. However, it should be noted that all reducing processes employing hydrocarbons are hindered by the fact that the dissociation of the said hydrocarbons is in endothermic phenomenon; the achievement of this dissociation or cracking, in a reducing apparatus, or before it, requires, therefore, an addition of heat, which is not necessary when the reducing process is performed with gases, which ab initio have a reducing effect, like carbon monoxide or hydrogen, or with carbon.

This phenomenon is particularly important in the case of methane, the dissociation heat of which is more than one therm per kilogram, which is much more regrettable, since this gas, the main component of natural gas, is the hydrocarbon most readily and economically available for metallurgical needs. In order to obviate these disadvantages, in an economical manner, the cracking of the hydrocarbons is effected outside of the metallurgical apparatus, and the cracked hydrocarbons are then introduced into the furnace. This cracking can be effected in two or more cracking chambers, which are placed alternatingly in the heating phase or the operating phase. These cracking chambers are similar to regenerators of blast furnaces and can be heated by any available hot gas such as waste gases; but this is not absolutely necessary and these chambers can take any form which is suitable for their functioning.

If the hydrocarbons are cracked outside of the metallurgical apparatus, in cracking chambers with intermittent operation, as described above, it is obvious that the temperatures of the cracked gases will be variable, the chamber in operating phase getting successively cooler until it is placed again in the heating phase. In order to maintain a thermic equilibrium in the furnace despite these variations in temperature, cold and uncracked hydrocarbons are injected at the nose of the electrodes, in the zone of the arcs, in variable or intermittent flow, depending on the temperature of the cracked gases.

The composition of the reducing agents introduced into the electric furnace depends on the characteristics of the charge introduced into the shaft. If the charge can be reduced only with difficulty, as it is the case for instance in the production of ferro-alloys, the rate of indirect reduction will be low and it will become necessary to introduce a large quantity of carbon in relation to the quantity of hydrogen. In this case, the quantities of coke or hydrocarbons, which are introduced, and their composition will be regulated in a manner that the ratio by weight of hydrogen to carbon is equal at the most to 0.20. On the other hand, if the leads can be easily reduced a relatively larger quantity of hydrogen will be introduced. More particularly in the production of pig iron, the ratio by weight of hydrogen to carbon will be within the range of 0.15 and 0.40. For the production of steel, the same ratio will be at least equal to 0.60.

The process of the present invention allows particularly the production of high-grade pig iron, due to employing, in the manner described, an electric arc furnace with a charge which is pre-heated, with injection of hydrocarbons at the nose of the electrodes, in the zones of the arcs, by a method called "cold process" which offers many advantages. This cold process is made possible due to the fact that with such an apparatus there is no apprehension of obtaining a too high percentage of sulfur in the metal.

In fact, in the above-described electric furnace, whether with or without previous cracking of injected hydrocarbons, the content of sulfur in the obtained metal is very low for the following reasons: first, the use of fuel containing sulfur is systematically avoided; then, the ore is desulfurized, before anything else, on the sintering strand; finally, any small quantity of sulfur which may still remain is partially eliminated by reaction with hydrogen in the shaft of the furnace, forming hydrogen sulfide.

On the other hand, in conventional electric reducing furnace operation, the cold process cannot be carried out because the sulfur content of the pig iron would be too high and it would be impossible of exactly controlling the temperature at the nose of the electrodes. The uncontrollable fluctuations of this temperature around a desired average temperature set too low, could bring about catastrophic cooling off of the charge, of the slag and of the metal, and could cause a complete stoppage of the apparatus.

In the hot process, in a normal electric reducing furnace, the temperature of the melting zone at the nose of the electrodes is very high and causes substantial overheating of the slag, which in turn forms a considerable proportion of silicon obtained by reduction (the normal content of silicon in the produced pig iron varies between 1% and 2%). On the other hand, in an electric furnace with a pre-heated charge of ore and injection of hydrocarbons, these injections made in the electric arc, at the nose of the electrodes, bring about a cooling off of this zone and limit the overheating of the slag as well as the quantity of silicon obtained by reduction. These injections of hydrocarbons can be used, more particularly, in order to regulate rapidly and almost instantaneously the operation of the furnace, correcting any irregularities.

The above-described "cold process" is a method which consists in regulating the feed of hydrocarbons arriving at the level of the electric arc depending on the consumed electric energy in such a manner that the "cold process" produces pig iron containing less than .4% of silicon.

By varying the ratio between the quantity of the injected hydrocarbons and the electric power consumed at the electrodes, it becomes possible to control closely the thermic level of the melting zone and consequently also the content of silicon in the pig iron. However, although this condition is necessary in order to insure a satisfactory cold process, it is not sufficient and it must be arranged, moreover, that the sinter has a minimum content of 1.5% of MnO. In order to obtain this result, it is necessary to include manganese ore in the charge fed to the sintering apparatus. In some rare cases (for instance, ore coming from Ouenza) the iron ore contains already a sufficient quantity of manganese which reaches and even surpasses the percentage of MnO given above. The manganese assures a supplementary thermic adjustment of the melting zone and makes possible a continuous cold process, which can be used in industrial installations without having to fear serious difficulties due to cooling.

By way of example only, the characteristics of the three types of processes are shown below, based on the use of ore from Ouenza for the sinter, and assuming an indirect rate of reduction by CO and $H_2$ in the shaft in the neighborhood of 71.5% which is almost constant:

|  | Cold Process | Normal Process | Hot Process |
|---|---|---|---|
| Content of Silicon in the pig iron, percent | .1 | .5 | 1.0 |
| Content of manganese in the pig iron, percent | 1.5 | 2.0 | 2.5 |
| Content of carbon in the pig iron, percent | 3.5 | 4.0 | 4.5 |
| Temperature in °C | 1,350 | 1,400 | 1,500 |
| Index of basicity $\frac{CaO+MgO}{SiO_2+Al_2O_3}$ | 1.22 | 1.38 | 1.86 |
| Volume of injected methane in cubic meters per one ton of pig iron | 245 | 252 | 261 |
| KWh*/t of pig iron, in the transformer: |  |  |  |
| (a) When methane is cold | 1,339 | 1,410 | 1,506 |
| (b) When methane is hot and cracked | 791 | 846 | 924 |

*KWh are calculated with a yield of 70% (transformer-thermic losses).

This cold process allows to obtain a number of advantages:

(a) The consumption of electric energy is smaller, because the temperature of the pig iron and of the slag are lower, and also because the proportion of silicon and manganese obtained by reduction is lower;

(b) The consumption of electrodes is lower for the same reasons as listed under (a);

(c) The content of silicon in the pig iron is lower, which is an advantage in the further processing of the pig iron to steel;

(d) It leads to a higher ratio between the content of manganese in pig iron, and the content of silicon in pig iron, so that the slag obtained in the steel mill during refining will be rich in manganese and contain little silicon, which is favorable for the recovery of manganese.

In an electric furnace arrangement in accordance with the present invention, the electrodes preferably are placed on the periphery of the hearth chamber around the shaft into which the charge is introduced, or alongside of it, if the shaft has an elongated configuration or if several shafts are placed in a row. The number of electrodes is such, that the reaction zones situated underneath these electrodes overlap partially so that something like a continuous crown-like area of reaction and melting is created around the shaft. The noses of the electrodes are buried in the charges and the arcs reach to the center of the mass. This operation as "immersed arcs" offers a number of advantages:

(a) The heat generated by the arc is absorbed to a great extent by the charge in the reaction zone and the calorific yield is excellent;

(b) The refractories of the hearth and the dome are protected, because the arc is surrounded by the agglomerate at a relatively low temperature and the radiation in the direction of the refractories is very limited;

(c) The diameter of the furnace may be very small for a given capacity of the shaft.

If the injections of hydrocarbons are made at the nose of the electrodes by means of injectors placed at the peripheral or passing through the dome of the hearth chamber, it is necessary that the contact zone of the flow of hydrocarbons with the surface of the bath is located in the neighborhood of the free end of the electrode.

Furthermore, efforts should be made to have as little of slag as possible so that the surface of the metal is free and clear. Therefore, the level of liquid metal in the hearth should be kept constant. For this purpose a pressure receptacle or fore-hearth, as described further above, should be arranged communicating with the hearth chamber of the furnace by a channel linking their lower parts. The pressure in this receptacle or fore-hearth can be varied by known means in order to keep the level of liquid metal in the hearth constant. The fore-hearth will possess at least one tap hole in order to withdraw from time to time a certain quantity of metal so that additional molten metal from the hearth chamber may be received.

The following examples are given as illustrative only of the present invention, the invention however not being limited to the specific details of the examples.

The ore used was Ouenza ore (Algeria) having the following analysis in the dry state;

Fe=54.4%  MgO=1.2%
$SiO_2$=4.5%  MnO=2.3%
CaO=5.3%  $CO_2$=5.6%
$Al_2O_3$=0.7%  $H_2O$=3.3%

In the following examples all the quantities shown are relative to one metric ton of pig iron obtained.

The ore is brought by sifting, crushing and milling to a size of 0/8 mm. It is then intimately mixed with coke dust, of a size comprised between 0 and 4 mm., recycled sifting fines and water in the following proportions;

| Wet ore | 1850 kg. (with 7.5% moisture) |
|---|---|
| Recycled fines | 700 kg. |
| Coke dust | 110 kg. |
| Water | 200 kg. |
| Mixture | 2850 kg. with 12% moisture |

This mixture is placed on the sintering strand 1. The combustion air is sucked up at the lower portion of the strand. A row of burners ignite the mixture which burns with air, heated at 1000° C. in heat exchangers of the same type as blast furnace stoves, and arriving through hood 2. All surface of the strand is thus fed by said hot air. About 1250 normal cubic metres are used on the strand and 250 cubic metre are lost through leaks. Consequently about 1500 normal cubic metres of air at 1000° C. are necessary for one metric ton of pig iron. For heating the heat exchangers a part of the combustible hot gases leaving the electric arc furnace are used.

At the exit of strand 1, the sinter is dislodged by the device 9 and sifted to obtain a size of 5 mm. by the sifting device 10. In that way about 700 kg. of fines are produced which are recycled, with 1530 kg. of sinter at 950° C. having a size of 5–40 mm. and the following analysis:

|  | Percent |
|---|---|
| Fe total | 61.3 |
| $Fe^{++}$ | 7.6 |
| CaO | 4.6 |
| $SiO_2$ | 4.15 |
| $Al_2O_3$ | 0.8 |
| MgO | 1.25 |
| MnO | 3.00 |

This sinter, charged in a bucket 11 is dumped at the top of the frusto-conical shaft of the furnace. Said shaft has a capacity of P cubic metres, P being the production of the furnace in metric tones of pig iron per hour.

In the shaft, the sinter is rapidly reduced by the gases which are ascending from the hearth. The efficiency of said gases is such that at the top of the shaft the ratio of CO to $CO_2$ (by volume) is equal to 1 and the ratio of $H_2O$ to $H_2$ (by volume) is equal to 1.43. The calorific value and the volume of said gas depend from the nature of the reducing gas used in the hearth.

In that respect four examples are given in the following table, corresponding to four different reducing agents.

| Reducing agent | Cold $CH_4$ | Hot $CH_4$ (C+$2H_2$) | Light fuel | Coke |
|---|---|---|---|---|
| Quantity of reducing agent used: | | | | |
| m3 | 245 | 245 | | |
| kg | | | 217 | 320 |
| Power used at the electrodes, KWh | 1,071 | 663 | 1,121 | 1,240 |
| Power used in the transformer, KWh | 1,530 | 905 | 1,600 | 1,770 |
| Analysis of pig iron, percent: | | | | |
| Si | 0.1 | 0.1 | 0.5 | 1.5 |
| Mn | 1.5 | 1.5 | 2.0 | 2.5 |
| C | 2.5 | 2.5 | 4.0 | 4.0 |
| Volume of gases produced: | | | | |
| m3N | 723 | 723 | 573 | 415 |
| CO | 12.5 | 12.5 | 24 | 50 |
| $CO_2$ | 12.5 | 12.5 | 24 | 50 |
| Analysis of gas, percent: | | | | |
| $H_2$ | 30.8 | 30.8 | 21.4 | 0 |
| $H_2O$ | 44.2 | 44.2 | 30.6 | 0 |
| Ratio of indirect reduction, percent | 71.5 | 71.5 | 54.5 | 34.5 |
| Ratio hydrogen to H/C carbon (by weight) | 0.333 | 0.333 | 0.133 | 0 |

In the first example, the reducing agent is methane insufflated in the cold state in the arc between the electrodes and the bath of molten metal. A pig iron cold and with a low carbon content is obtained.

In the second example, the reducing agent is methane insufflated at 925° C., which is entirely decomposed by cracking to obtain hydrogen and carbon.

In the third example, the reducing agent is light fuel insufflated in the cold state in the arc. The pig iron produced is hot and with higher carbon content. The ratio of indirect reduction is lowered from 71.5% to 54.5%.

In the fourth example, the reducing agent is coke and the ratio of indirect reduction is lowered to 34.5%. The pig iron is then very hot and with a high carbon content.

It will be understood that each of the elements described above, or two or more together, may also find a useful application in other types of smelters differing from the types described above.

While the invention has been illustrated and described as embodied in an electric arc iron ore smelting device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An electric arc furnace, comprising, in combination, a hearth section; means for maintaining molten material in said hearth section at a predetermined level; means for producing an electric arc in said hearth section above said predetermined level, said electric arc producing means including a plurality of electrodes, at least one of said electrodes being formed with an interior conduit opening in the area of the tip of said one electrode and adapted for the injection therethrough of fluid hydrocarbons into said hearth section in the vicinity of said electric arc; and a downwardly flaring elongated shaft section having upper and lower end portions, said lower end portion being located above and communicating with said hearth section, whereby the charge introduced into said furnace at the upper end portion of said shaft section will pass downwardly into said hearth section in countercurrent flow to reducing gases issuing from said hearth section and will be separated by the electric arc in said hearth section into a molten metal portion and a slag portion.

2. In a device of the character described, an ore smelter comprising, in combination, an ore melting section having an ore inlet portion; means for maintaining molten material in said hearth section at a predetermined level; electrode means for producing an electric arc in said ore melting section above said predetermined level, said electrode means including at least one electrode formed with an interior conduit for injecting fluid hydrocarbons into said melting section at a point located in the vicinity of said electric arc, and said at least one electrode including cooling means for preventing cracking of hydrocarbons while the same pass through said conduit; and a shaft section having two opposite end portions, one of said end portions being located adjacent to and communicating with said ore inlet portion and the other of said end portions being adapted to receive a hot agglomerated ore charge.

3. An ore smelting arrangement, comprising in combination, an ore melting section having an ore inlet portion; means for maintaining molten material in said ore melting section at a predetermined level; means for producing an electric arc in said ore melting section, said electric arc producing means including at least two electrodes having arc-forming portions located in said ore melting section above said predetermined level; a shaft section having two opposite end portions, one of said end portions being located adjacent to and communicating with said ore inlet portion and the other of said end portions being adapted to receive the charge; means for injecting a reducing fluid into said ore melting section, said reducing fluid injecting means including at least two direct heat exchange chambers adapted to withstand elevated temperatures of at least 1200° C., and also including means for alternatingly passing heating gasses and fluid hydrocarbons through said chambers so that each of said chambers is heated during the passage of heating gases therethrough and is cooled during the passage of hydrocarbons therethrough, said hydrocarbons being cracked during passage through one of said chambers and the thus-formed cracked hydrocarbons constituting at least part of the reducing fluid being injected into said ore melting section.

References Cited in the file of this patent

UNITED STATES PATENTS

| | | |
|---|---|---|
| 691,474 | Lincoln | Jan. 21, 1902 |
| 1,215,635 | Dwight | Feb. 13, 1917 |
| 1,299,337 | Hechenbleikner | Apr. 1, 1919 |
| 1,317,327 | Shoeld | Sept. 30, 1919 |
| 1,837,696 | Wiles | Dec. 22, 1931 |
| 1,946,252 | Wiles | Feb. 6, 1934 |
| 2,087,272 | Wile | July 20, 1937 |
| 2,290,961 | Huer | July 28, 1942 |
| 2,862,792 | Rehm | Dec. 2, 1958 |

FOREIGN PATENTS

| | | |
|---|---|---|
| 1,146,218 | France | May 20, 1957 |